(12) United States Patent
Chae

(10) Patent No.: US 6,947,108 B2
(45) Date of Patent: Sep. 20, 2005

(54) REFLECTIVE LIQUID CRYSTAL DISPLAY DEVICE AND METHOD FOR MANUFACTURING THE SAME

(75) Inventor: Gee Sung Chae, Incheon-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,045

(22) Filed: Dec. 11, 2002

(65) Prior Publication Data

US 2003/0117552 A1 Jun. 26, 2003

(30) Foreign Application Priority Data

Dec. 26, 2001 (KR) .................................... 2001-85288

(51) Int. Cl.⁷ .......................................... G02F 1/1335
(52) U.S. Cl. ....................................... 349/113; 349/43
(58) Field of Search ............................. 349/113, 43, 42

(56) References Cited

U.S. PATENT DOCUMENTS 6,300,152 B1 * 10/2001 Kim ........................... 438/30
6,327,009 B1 * 12/2001 Ichimura ..................... 349/113
6,529,256 B1 * 3/2003 Seo ............................ 349/141
6,665,030 B2 * 12/2003 Hanazawa et al. .......... 349/113
6,696,324 B2 * 2/2004 Hong et al. ................. 438/149

FOREIGN PATENT DOCUMENTS

JP 11-218751 A 8/1999

* cited by examiner

Primary Examiner—Robert H. Kim
Assistant Examiner—Richard H Kim
(74) Attorney, Agent, or Firm—McKenna Long & Aldridge LLP

(57) ABSTRACT

A reflective liquid display device and a method for manufacturing the same which has high luminance. The reflective liquid crystal display device includes a plurality of gate and data lines formed on a reflective substrate to cross with one another, thereby defining a plurality of pixel regions; gate and data pads respectively formed at each one end of the gate and data lines; a thin film transistor connected to the gate and data lines; a passivation layer having a plurality of holes within the pixel region, being formed on an entire surface of the reflective substrate; a first transparent electrode formed on the passivation layer; a second transparent electrode formed on the passivation layer between the holes of the pixel region; and a silver (Ag) alloy layer formed on the second transparent electrode within the pixel region and the passivation layer having the holes.

20 Claims, 6 Drawing Sheets

REFLECTIVE LIQUID CRYSTAL DISPLAY DEVICE AND METHOD FOR MANUFACTURING THE SAME

This application claims the benefit of the Korean Application No. P.2001-85288 filed on Dec. 26, 2001, which is hereby incorporated by reference for all purposes as if fully set forth herein.

BACKGROUND OF THE INVENTION

1. Field of the Invention

The present invention relates to a liquid crystal display device, and more particularly, to a reflective liquid crystal display device having high reflectivity and a method for manufacturing the same.

2. Discussion of the Related Art

A typical liquid crystal display (LCD) device is provided with lower and upper substrates facing each other at a predetermined distance, and a liquid crystal layer formed between the lower and upper substrates. The liquid crystal layer is driven by an electric field formed between the lower and upper substrates, so that the light transmittance is controlled, thereby displaying an image on an LCD panel. However, the LCD device does not emit light by itself, so that a backlight is additionally required to display the image on the LCD panel, or natural light is used as a light source to the LCD device.

In general, the LCD device is classified into two types, i.e., a transmissive liquid crystal display device using the backlight as the light source, and a reflective liquid crystal display device using the natural light as the light source. The transmissive liquid crystal display device has limitations in that it is hard to obtain ultra-thinness and lightness due to the weight and volume of the backlight. Also, power consumption increases since the backlight is driven. Accordingly, many efforts have been made to study the reflective liquid crystal display (LCD) device using natural light as the light source.

A related art reflective LCD device will be explained with reference to the accompanying drawings.

FIG. 1A is a plan view illustrating a unit pixel in a lower substrate of a related art reflective LCD device. FIG. 1B is a sectional view illustrating a unit pixel in a lower substrate of a related art reflective LCD device according to the present invention taken along line A—A of FIG. 1A. Although not shown, a plurality of pixels are formed in a matrix type at left and bottom sides in the context of FIG. 1A.

As shown in FIG. 1A and FIG. 1B, a plurality of gate lines 12 are horizontally formed on a lower substrate 10, and a gate pad 12a is formed at each one end of the gate lines 12. A plurality of gate electrodes 14 are projected from the gate line at a predetermined interval. A gate insulating layer 16 is formed on an entire surface of the lower substrate, and a semiconductor layer 18 is patterned on the gate insulating layer 16. Then, a plurality of data lines 20 are formed to cross the plurality of gate lines 12, thereby defining a plurality of pixel regions. At this time, a data pad 20a is formed at each one end of the data lines 20, and source/drain electrodes 22 and 24 are formed on the same layer as the data line 20. The source/drain electrodes 22 and 24 are patterned on the semiconductor layer 18, thereby forming a thin film transistor (TFT) with the gate electrode 14.

A passivation layer 26 is formed on the entire surface of the lower substrate, and reflective electrodes 30 and 30a are formed on the passivation layer 26. At this time, the reflective electrode 30 is connected to the drain electrode 24 of the thin film transistor through a contact hole formed in the passivation layer 26 (not labeled). Also, the reflective electrode 30a is connected to the gate pad 12a and the data pad 20a through a contact hole (not labeled) formed in the passivation layer 26 and the gate insulating layer 16. In general, the reflective electrodes 30 and 30a are made of Aluminum (Al) having high reflectivity and high transmittance.

In order to achieve the LCD device having high luminance, it is necessary to form the reflective electrode having high reflectivity. The reflective electrode being made of aluminum (Al) may deform during a heat treatment process due to a poor heat-resistance of aluminum (Al). Accordingly, the reflective electrode has to be made of a material having high heat-resistance and high reflectivity.

SUMMARY OF THE INVENTION

Accordingly, the present invention is directed to a reflective liquid crystal display device and a method for manufacturing the same that substantially obviates one or more of the problems due to limitations and disadvantages of the prior art.

An advantage of the present invention is to provide a reflective liquid crystal display device and a method for manufacturing the same, in which a reflective electrode is made of silver (Ag) which has higher reflectivity and higher heat-resistance than aluminum, so that it is possible to prevent the reflective electrode from deforming, thereby forming the reflective liquid crystal display device having high luminance.

Additional features and advantages of the invention will be set forth in the description which follows, and in part will become apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a reflective liquid crystal display device includes a plurality of gate and data lines formed on a reflective substrate to cross with one another, thereby defining a plurality of pixel regions; gate and data pads respectively formed at each one end of the gate and data lines; a thin film transistor connected to the gate and data lines; a passivation layer having a plurality of holes within the pixel region, and being formed on an entire surface of the reflective substrate; a first transparent electrode formed on the passivation layer for being electrically connected to the gate and data pads; a second transparent electrode formed on the passivation layer between the holes of the pixel region for being electrically connected to the thin film transistor; and a silver (Ag) alloy layer formed on the second transparent electrode within the pixel region and the passivation layer having the holes.

The silver alloy has high reflectivity and high heat-resistance, however, the silver alloy has poor resistance to moisture. For this reason, problems may generate during manufacturing process steps if the reflective electrode is made of the silver alloy. Also, if the gate and data pads being connected to a Tape Carrier Package (TCP) are exposed to the outside, problems may generate during a TCP bonding process since moisture easily adheres to the surface of the silver alloy. Accordingly, if the reflective electrode is made of the silver alloy, it is required to provide a stable patterning process in the structure and a stable TCP bonding process in the electrodes.

In the present invention, the transparent electrode is firstly formed, and then the silver alloy layer is formed on the transparent electrode within the pixel region, thereby solving the aforementioned problems.

That is, the transparent electrode is formed at a portion for connecting a TCP to the gate and data pads, thereby stably performing TCP bonding. After forming the transparent electrode within the pixel region, the silver alloy layer is formed on the transparent electrode, thereby improving adhesion between the silver alloy layer and a lower layer. Accordingly, it is possible to obtain CD-Loss? and Edge-Profile? that are main elements for patterning.

An external light incident from one direction is reflected to a direction opposing to the one direction, thereby narrowing a viewing angle of a user. Accordingly, in the present invention, the passivation layer and the transparent electrode are patterned, and then the silver alloy layer having uneven surfaces is formed thereon, thereby dispersing the reflected light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, example of which is illustrated in the accompanying drawings. Wherever possible, the same reference numbers will be used throughout the drawings to refer to the same or like parts.

Figure 1A:
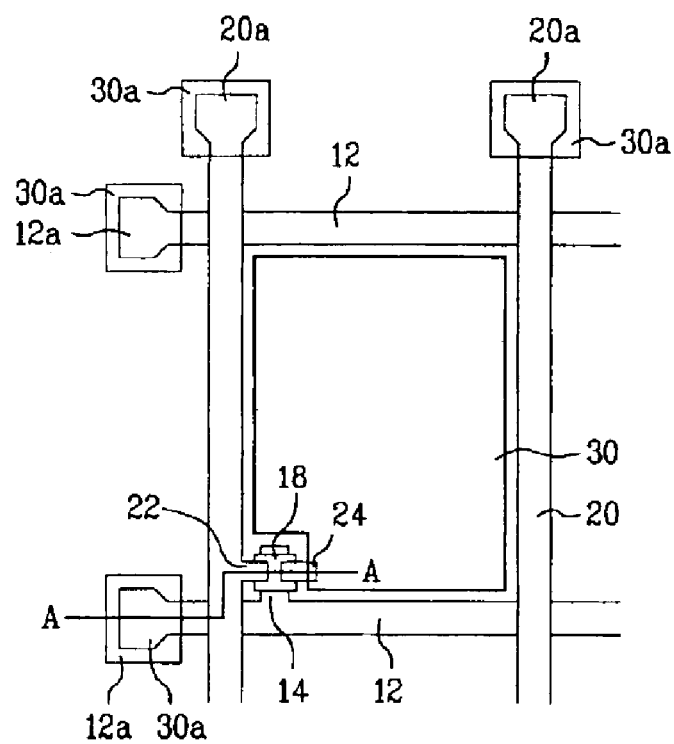
FIG. 1A is a plan view illustrating a lower substrate of a related art reflective LCD device.
Figure 1B:
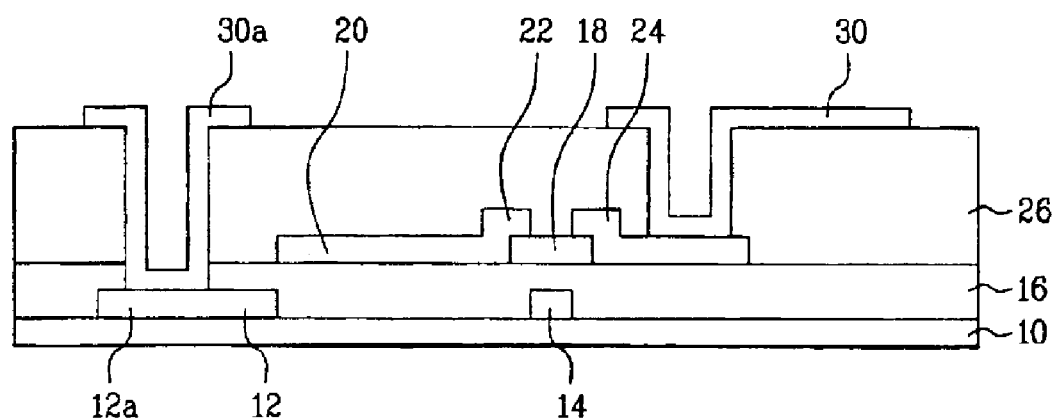
FIG. 1B is a sectional view illustrating a lower substrate of a related art reflective LCD device taken along line A—A of FIG. 1A.
Figure 2:
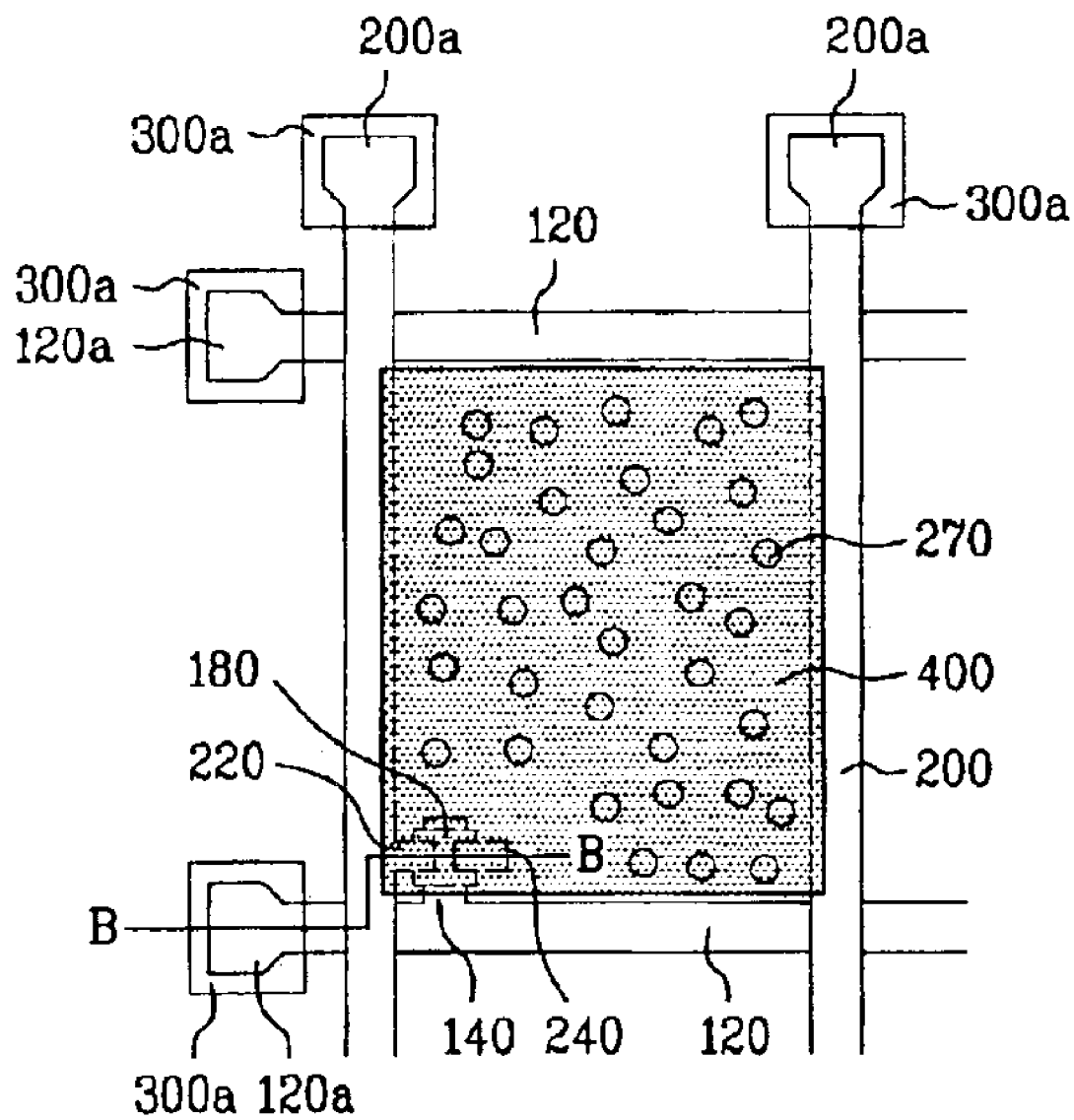
FIG. 2 is a plan view illustrating a reflective substrate of a reflective LCD device according to the present invention.
Figure 3A:
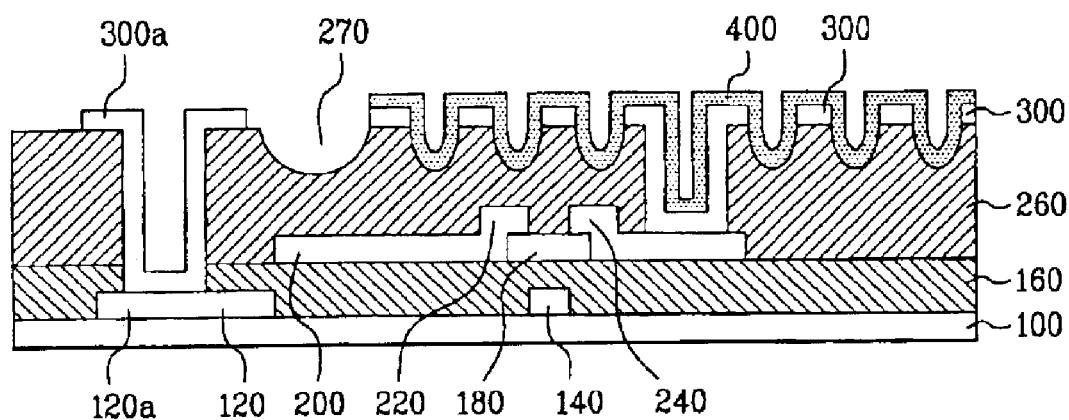
FIG. 3A and FIG. 3B are sectional views illustrating a reflective substrate of a reflective LCD device according to the present invention taken along line B—B of FIG. 2.
Figure 3B:
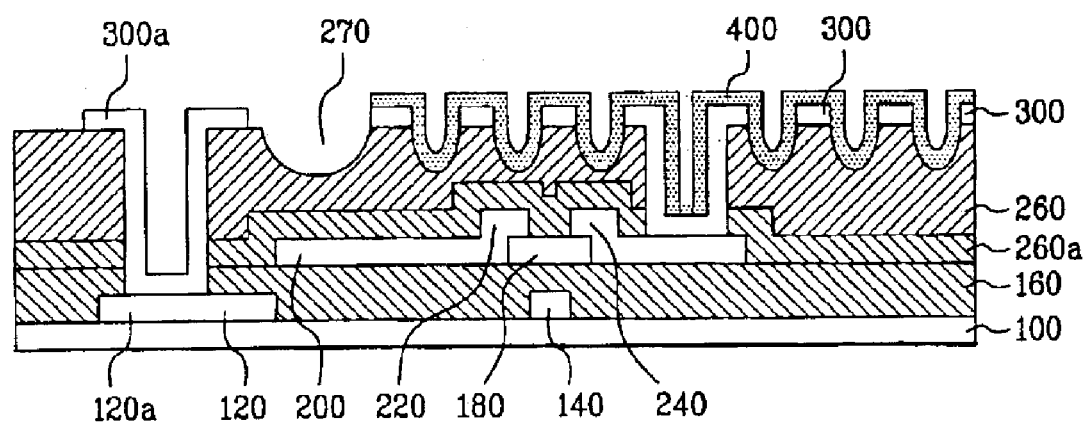

FIG. 2 is a plan view illustrating a reflective substrate of a reflective LCD device according to the present invention. FIG. 3A and FIG. 3B are sectional views illustrating a reflective substrate of a reflective LCD device according to the present invention taken along line B—B of FIG. 2. Although a unit pixel is shown in accompanying drawings, a plurality of pixels are formed in a matrix type at right and bottom sides in the context of the drawings.

As shown in FIG. 2 and FIG. 3A, a plurality of gate lines 120 are horizontally formed on a substrate 100, and a gate pad 120a is formed at each one end of the gate lines 120. A plurality of gate electrodes 140 are projected from the gate line 120. The gate line 120, the gate pad 120a and the gate electrode 140 may be made of aluminum (Al), Al alloy, molybdenum/aluminum (Mo/Al), or chromium/aluminum (Cr/Al). A gate insulating layer 160 is formed on an entire surface of the substrate 100, and a semiconductor layer 180 is patterned on the gate insulating layer 160. At this time, the gate insulating layer may be made of $SiN_x$ or $SiO_x$, and the semiconductor layer may be made of amorphous silicon (a-Si) or polycrystalline silicon (p-Si). Although not shown, an ohmic contact layer of $n^+$ a-Si may be formed on the semiconductor layer 180.

Then, a plurality of data lines 200 are formed to cross the plurality of gate lines 120, thereby defining a plurality of pixel regions. A data pad 200a is formed at each one end of the data lines 200. Also, source and drain electrodes 220 and 240 are formed on the same layer as the data line 200. The source and drain electrodes 220 and 240 are patterned on the semiconductor layer 180, thereby forming a thin film transistor with the gate electrode 140. The source and drain electrodes 220 and 240 may be made of Al, Cr, titanium (Ti) or Al alloy.

A passivation layer 260 is formed on the entire surface of the substrate. The passivation layer 260 includes a plurality of holes 270 within the pixel region and a plurality of contact holes for exposing the drain electrode 240, the gate pad 120a and the data pad 200a. The passivation layer 260 may be formed as an inorganic insulating layer being made of $SiN_x$ or $SiO_x$, or an organic insulating layer being made of BenzoCycloButene (BCB) or photoacrylate according to a structure of the LCD device.

A first transparent electrode 300a is formed on the passivation layer 260 in the exterior of the pixel region for being connected to the gate pad 120a and the data pad 200a through the contact hole. A second transparent electrode 300 is formed on the passivation layer 260 between the holes 270 of the pixel region for being connected to the drain electrode 240 through the contact hole. At this time, the first and second transparent electrodes 300a and 300 are made of indium tin oxide (ITO).

A silver (Ag) alloy layer 400 is formed in the pixel region. That is, the silver (Ag) alloy layer 400 is formed on the passivation layer 260 having the plurality of holes 270 and on the second transparent electrode 300 formed between the holes 270, so that the silver alloy layer 400 has uneven surfaces. The reflective electrode is formed at the maximum size so as to improve reflectivity. For this reason, the reflective electrode is overlapped with the data line 200, and to cover the thin film transistor with the reflective electrode.

If the passivation layer 260 is formed as the organic insulating layer, the organic insulating layer is contacted with the semiconductor layer 180 that is a channel layer of the thin film transistor, thereby increasing the deterioration characteristics of the thin film transistor. In this case, the passivation layer 260 is made of an organic insulating layer such as BenzoCycloButene (BCB) or photoacrylate between the reflective electrode 200 and the data line 200/thin film transistor so as to insulate the reflective electrode from the data line 200 and the thin film transistor.

If the passivation layer 260 is formed as the organic insulating layer, the organic insulating layer contacts the semiconductor layer 180 that is a channel layer of the thin film transistor, thereby deteriorating characteristics of the thin film transistor. For this reason, the inorganic insulating layer 260a being made of $SiN_x$ or $SiO_x$ is additionally formed between the organic insulating layer and the semiconductor layer, shown in FIG. 3B. That is, the passivation is preferably formed as a double layer of the inorganic insulating layer 260a and the organic insulating layer 260.

Also, an alignment layer may be formed on the silver alloy layer 400. The alignment film may be formed using any of polyamide, polyimide compound, polyvinylalcohol (PVA) and polyamic acid with rubbing. The alignment film may be formed from any material having photoreaction such as polyvinylcinnamate (PVCN), polysiloxanecinnamate (PSCN) or cellulosecinnamate (CelCN) with rubbing.

Although not shown, a black matrix is formed on a substrate opposing to the reflective substrate at a predetermined distance for preventing a light from leaking in regions except the pixel region. A color filter layer is formed on the black matrix, and a common electrode is formed on the color filter layer. An overcoat layer may be additionally formed between the color filter layer and the common electrode so as to protect the color filter layer and to flatten the substrate. An alignment layer may be formed on the common electrode. Then, a liquid crystal layer is formed between the substrates.

FIG. 4A to FIG. 4I are sectional views illustrating manufacturing process steps of a reflective LCD device according to the present invention, which illustrates sectional views taken along line B—B of FIG. 2.

Figure 4A:
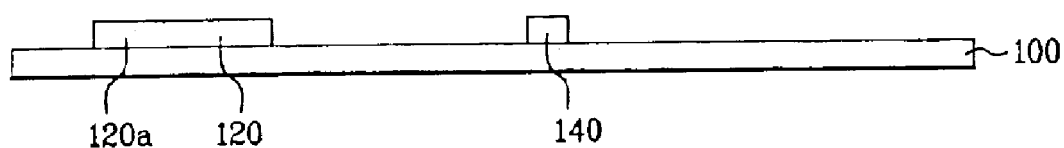
FIG. 4A to FIG. 4I are sectional views illustrating manufacturing process steps of a reflective LCD device according to the present invention.
Figure 4B:
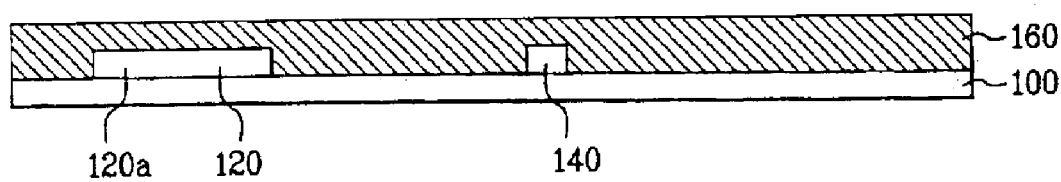

As shown in FIG. 4A, Al, Al alloy, Mo/Al or Cr/Al is deposited on the substrate 100 by sputtering, and is patterned by photolithography, thereby forming the gate line 120, the gate pad 120a and the gate electrode 140. Then, $SiN_x$ or $SiO_x$ is deposited on the entire surface of the substrate by plasma chemical vapor deposition (CVD) method, thereby forming the gate insulating layer 160, as shown in FIG. 4B.

Figure 4C:
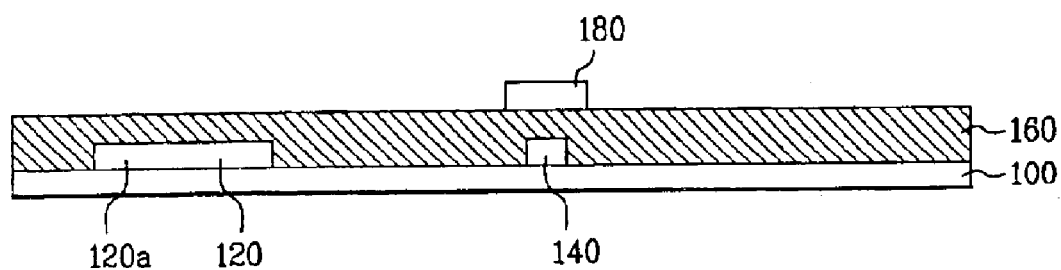

Referring to FIG. 4C, the amorphous silicon or the polycrystalline silicon is deposited on the substrate by a CVD method, and then is patterned, thereby forming the semiconductor layer 180. The ohmic contact layer may be additionally formed on the semiconductor layer 180.

Figure 4D:
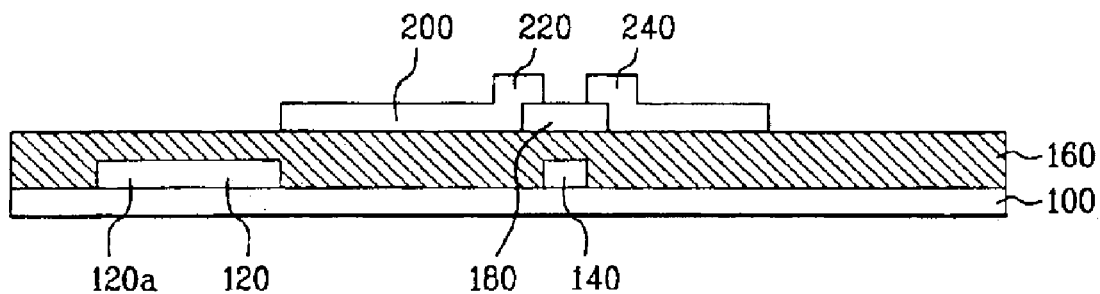

As shown in FIG. 4D, a metal such Al, Cr, Ti or Al alloy is deposited on the substrate by sputtering, and then is patterned by photolithography, thereby forming the data line 200, the data pad, the source electrode 220 and the drain electrode 240.

Figure 4E:
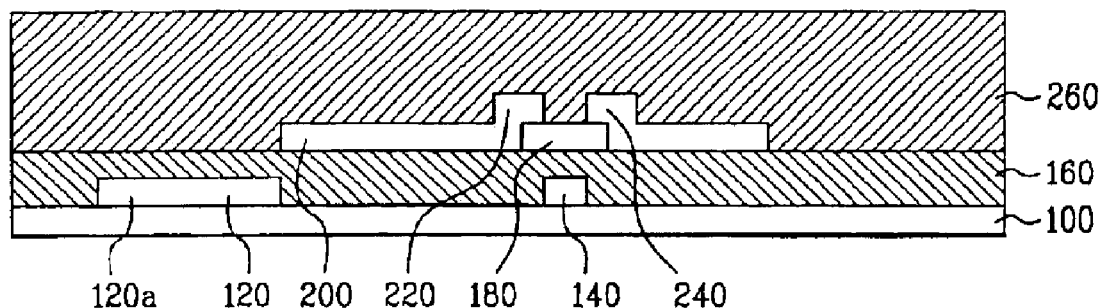

As shown in FIG. 4E, the passivation layer 260 may be formed as the inorganic insulating layer being made of $SiN_x$ or $SiO_x$ on the entire surface of the substrate, or may be formed as the organic insulating layer being made of BenzoCycloButene (BCB) or photoacrylate. Also, it is possible to form the passivation layer as the double layer of the organic insulating layer and the inorganic insulating layer. That is, the inorganic insulating is formed, and then the organic insulating layer is formed on the inorganic insulating layer.

Figure 4F:
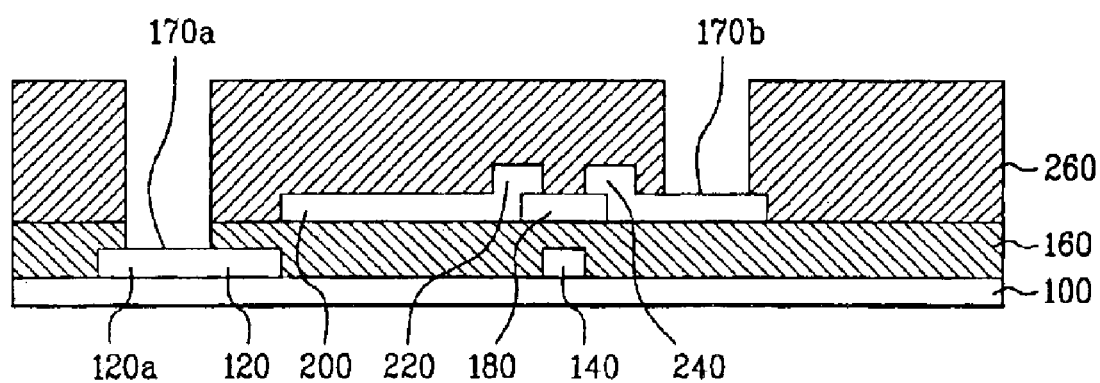

As shown in FIG. 4F, the passivation layer 260 and the gate insulating layer 160 are partially etched, thereby forming the first contact hole 170a for exposing the gate pad 120a and the data pad. The second contact hole 170b exposing the drain electrode 240 is formed by etching the passivation layer 260.

Figure 4G:
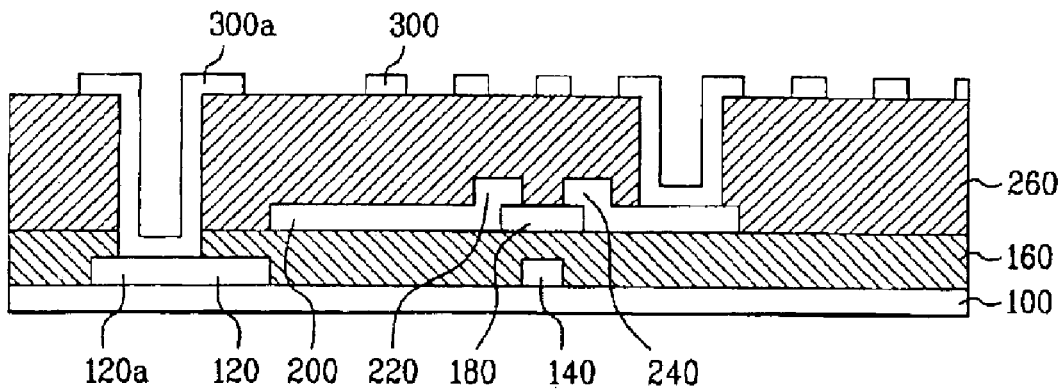

Referring to FIG. 4G, a transparent metal such as ITO is deposited by sputtering, thereby forming the first and second transparent electrodes 300a and 300 for being connected to the pad and the drain electrodes through the first and second contact holes 300a and 300, respectively. The second transparent electrode 300 is patterned within the pixel region in a predetermined shape. The second transparent electrode 300 is formed in an island shape, for example.

Figure 4H:
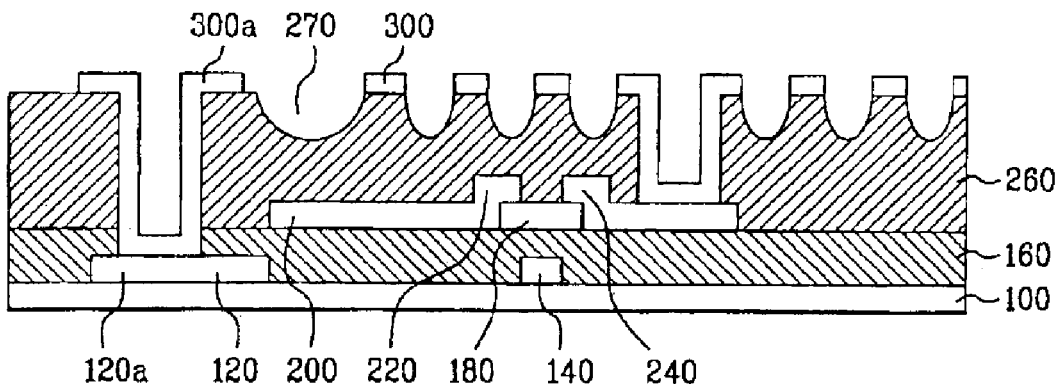

Referring to FIG. 4H, the passivation layer is partially etched between the patterned second transparent electrodes 300, thereby forming the hole 270.

Figure 4I:
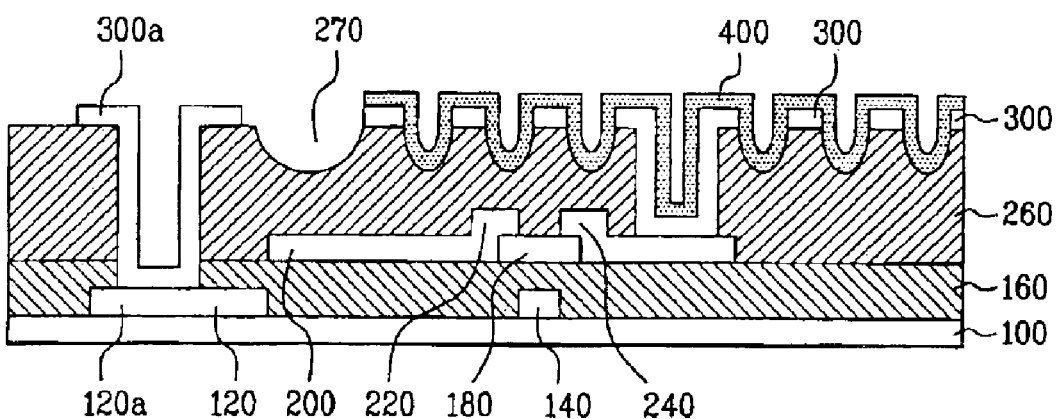

As shown in FIG. 4I, the silver (Ag) alloy layer 400 is formed on the patterned second transparent electrode 300 and the hole 270, so that the reflective electrode is formed, thereby forming the reflective substrate for the reflective LCD device.

In the reflective LCD device according to the present invention, the reflective electrode is made of silver (Ag) alloy having high reflectivity, thereby obtaining high luminance in the reflective LCD device. Also, it is possible to form the reflective electrode having uneven surfaces in simple process steps.

Furthermore, the transparent electrode is formed at a portion for connecting a Tape Carrier Package (TCP) to the gate and data pads, thereby performing TCP bonding process stably. After forming the transparent electrode in the pixel region, the silver alloy layer is formed on the transparent electrode of the pixel region, thereby stably adhering the silver alloy layer to a lower layer.

It will be apparent to those skilled in the art than various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reflective liquid crystal display device comprising:
   a plurality of gate and data lines formed on a reflective substrate to cross with one another, thereby defining a plurality of pixel regions;
   gate and data pads respectively formed at each one end of the gate and data lines;
   a thin film transistor connected to the gate and data lines;
   a passivation layer having a plurality of holes within the pixel region, being formed on an entire surface of the reflective substrate;
   a first transparent electrode formed on the passivation layer for being electrically connected to the gate and data pads;
   a second transparent electrode formed on the passivation layer within the pixel region except the holes for being electrically connected to the thin film transistor; and
   a silver (Ag) alloy layer formed on the second transparent electrode within the pixel region and the passivation layer having the holes.

2. The reflective liquid crystal display device as claimed in claim 1, wherein the passivation layer is formed as an organic insulating layer.

3. The reflective liquid crystal display device as claimed in claim 2, wherein the organic insulating layer is made of one of BenzoCycloButene (BCB) and photoacrylate.

4. The reflective liquid crystal display device as claimed in claim 1, wherein the passivation is formed as a double layer of an inorganic insulating layer and an organic insulating layer.

5. The reflective liquid crystal display device as claimed in claim 4, wherein the inorganic insulating layer is made of one of $SiN_x$ and $SiO_x$, and the organic insulating layer is made of one of BenzoCycloButene (BCB) and photoacrylate.

6. The reflective liquid crystal display device as claimed in claim 1, wherein the silver alloy layer is partially overlapped with the data line, and covers the thin film transistor.

7. The reflective liquid crystal display device as claimed in claim 1, wherein the transparent electrode is made of indium tin oxide (ITO).

8. The reflective liquid crystal display device as claimed in claim 1, wherein an alignment layer is additionally formed on the silver alloy layer.

9. The reflective liquid crystal display device as claimed in claim 1, further comprising;
   an opposite substrate facing to the reflective substrate;
   a black matrix, a color filter layer and a common electrode for being sequentially formed on the opposite substrate; and
   a liquid crystal layer formed between the reflective and opposite substrates.

10. A method for manufacturing a reflective LCD device comprising:
    forming a gate line, a gate pad and a gate electrode on a reflective substrate;
    forming a gate insulating layer on an entire surface of the reflective substrate;
    forming a semiconductor layer on the gate insulating layer;
    forming a data line for crossing the gate line so as to define a pixel region, a data pad, and source/drain electrodes on the semiconductor layer;
    forming a passivation layer on an entire surface of the reflective substrate the passivation layer having a plurality of holes within a pixel region;
    forming a first contact hole by etching the gate insulating layer and the passivation layer for exposing the gate and data pads, and a second contact hole by etching the passivation layer for exposing the drain electrode;
    forming a first transparent electrode being connected to the gate and data pads through the first contact hole, and a second transparent electrode being connected to the drain electrode through the second contact hole, the second transparent electrode being patterned in a predetermined shape within the pixel region except for the plurality of holes;
    forming a hole by etching the passivation layer between patterned second transparent electrodes such that the patterned second transparent electrode does not overlap the hole; and
    forming a silver (Ag) alloy layer on the patterned second transparent electrode and the passivation layer of the hole shape between the patterned second transparent electrodes.

11. The method as claimed in claim 10, wherein the passivation layer is formed as an organic insulating layer.

12. The method as claimed in claim 11, wherein the organic insulating layer is made of one of BenzoCycloButene (BCB) and photoacrylate.

13. The method as claimed in claim 10, wherein the passivation layer is formed in a double layer as forming an organic insulating layer on an inorganic insulating layer.

14. The method as claimed in claim 13, wherein the inorganic insulating layer is made of one of $SiN_x$ and $SiO_x$, and the organic insulating layer is made of one of BenzoCycloButene (BCB) and photoacrylate.

15. The method as claimed in claim 10, wherein an alignment layer is additionally formed after forming a silver alloy layer.

16. The method as claimed in claim 15, wherein the alignment layer is rubbed.

17. The method as claimed in claim 15, wherein the alignment layer is rubbed with any material having photo reaction.

18. The method as claimed in claim 15, wherein the second transparent electrode is formed in an island shape.

19. The method as claimed in claim 10, wherein the gate line, gate pad, and gate electrode are formed by sputtering a metal made of one of Al, Al alloy, Mo/Al, and Cr/Al and then patterning the metal.

20. The method as claimed in claim 10, wherein the data line, data pads, and source/drain electrodes are formed by sputtering a metal made of one of Al, Cr, Tl, and Al alloy and then patterning the metal.

* * * * *